United States Patent [19]

De Cremoux

[11] Patent Number: 5,133,807
[45] Date of Patent: Jul. 28, 1992

[54] PROCESS AND INSTALLATION FOR THE CONTINUOUS PRODUCTION OF SUGAR CRYSTALS

[75] Inventor: Jacques De Cremoux, Lille-Hellemmes, France

[73] Assignee: FCB, Montreuil, France

[21] Appl. No.: 686,496

[22] Filed: Apr. 17, 1991

[30] Foreign Application Priority Data

Apr. 20, 1990 [FR] France .................. 90/05045

[51] Int. Cl.$^5$ .................. B01D 9/02; B01D 1/00; C13F 1/02
[52] U.S. Cl. ........................ 127/15; 127/16; 127/58; 127/61; 159/44; 159/45
[58] Field of Search .............. 127/15, 16, 58, 61; 159/44, 45

[56] References Cited

U.S. PATENT DOCUMENTS

| 3,424,221 | 1/1969 | Luce | 159/26 |
| 3,627,582 | 12/1971 | Dambrine et al. | 127/16 |
| 3,879,215 | 4/1975 | De Villiers et al. | 127/16 |

Primary Examiner—Theodore Morris
Assistant Examiner—P. L. Hailey
Attorney, Agent, or Firm—Collard & Roe

[57] ABSTRACT

A two-stage crystallization for the continuous production of sugar crystals from syrup comprises crystallizing the syrup in a first stage by subjecting the syrup to a sufficient heat of evaporation to produce a massecuite comprising water and a small content of dry material and having a low supersaturation coefficient, and subjecting the massecuite to flash evaporation of a certain volume of water and a notable increase in the supersaturation, and subsequently effectuating crystallization of the massecuite produced in the first stage by cooling in a second stage.

5 Claims, 2 Drawing Sheets

PROCESS AND INSTALLATION FOR THE CONTINUOUS PRODUCTION OF SUGAR CRYSTALS

BACKGROUND OF THE INVENTION

1. Field of the Invention

The present invention relates to a two-stage crystallization for the continuous production of sugar crystals from syrup, wherein the mother liquor is maintained at supersaturation and crystallization is obtained by crystallizing the syrup in a first stage by subjecting the syrup to heat of evaporation to produce a massecuite, and subsequently effectuating crystallization of the massecuite produced in the first stage by cooling in a second stage. Syrup is constituted by water in which sugar and impurities, which constitute the dry material, are dissolved. In the massecuite, the dry material is constituted by crystals, on the one hand, and the sugar and impurities dissolved in the mother liquor, on the other hand.

2. Description of the Prior Art

In a known process of this type, the first operating stage is effectuated in an apparatus constituted by a tank divided into a succession of crystallizing compartments or cells equipped with heating means, such as steam-fed radiators, which compartments are traversed successively by a massecuite constituted in a first one of the compartments by adding a seed magma to a syrup of dry matter (sugar) and water, and complemented in the succeeding compartments by metered additions of syrup. The additional amounts of syrup fed to each successive compartment and the supply of calories to the massecuite flowing through the compartments are so controlled that the mother liquor is maintained at a state of supersaturation and in a manner permitting the sugar crystals to grow progressively from the inlet to the outlet of the tank, i.e. from the first to the last compartment. The sugar crystallization and the evaporation of water from the mother liquor cause a progressive augmentation of the content of dry material (Brix) in the massecuite and, consequently, increase the viscosity thereof. In this conventional process, this first crystallization stage is so operated that the massecuite has as high a content of sugar crystals as possible and whose viscosity is limited only by the flow properties required for feeding the massecuite to the second crystallization stage in a mixer-cooler. Because of the high viscosity of the massecuite in the last compartment at the outlet of the tank, there is little heat exchange between the massecuite and the heating means in this compartment, and it is necessary to increase the surface of the heating means in this compartment and/or to generate a higher vacuum in the crystallization apparatus.

The second stage of the conventional sugar crystallization is effectuated in a mixer where the massecuite is slowly cooled to advance the crystallization and the growth of the sugar crystals, taking advantage of the reduced solubility of sugar at lower temperatures. Conventional mixers used in the second stage are usually equipped with vanes and thermal exchange elements through which cold water flows. It is also known to use mixers operating under a vacuum, in which cooling is caused by evaporation due to expansion.

SUMMARY OF THE INVENTION

It is the primary object of this invention to improve the two-stage crystallization of sugar by permitting a reduction of the dry material in the massecuite produced in the first stage and, consequently, the viscosity of the massecuite without reducing the total output whereby the productivity is enhanced and the conditions of use of the crystallization plant are improved.

The above and other objects are accomplished according to one aspect of the invention with a two-stage crystallization process for the continuous production of sugar crystals from syrup, which comprises the steps of crystallizing the syrup in a first stage by subjecting the syrup to a sufficient heat of evaporation to produce a massecuite comprising water and a small content of dry material and having a low supersaturation coefficient, the dry material content and the supersaturation coefficient of the massecuite being low in comparison with conventional values of these parameters, and subjecting the massecuite to flash evaporation of a certain volume of water and a notable increase in the supersaturation, and subsequently effectuating crystallization of the massecuite produced in the first stage by cooling in a second stage. The flash evaporation and the crystallization by cooling may be effectuated in several stages.

According to another aspect of the present invention, there is provided an installation for the continuous production of sugar crystals from syrup, which comprises, in series, a crystallizing apparatus for subjecting the syrup to a sufficient heat of evaporation to produce a massecuite comprising water and a small content of dry material and having a low supersaturation coefficient, the crystallizing apparatus including a first tank divided into a succession of crystallization compartments and heating means for generating the evaporation heat, the first tank having an outlet for the massecuite, a source of vacuum connected to the crystallizing apparatus for lowering the pressure therein below atmospheric pressure and correspondingly lowering the boiling temperature of the syrup, a flash tank having an inlet and an outlet, the inlet being connected to the outlet of the first tank for feeding the massecuite from the first tank outlet to the flash tank inlet, means connected to the flash tank for maintaining in the flash tank a pressure lower than the pressure in at least a last one of the compartments at the outlet of the first tank (i.e. a higher vacuum) to cause flash evaporation of a certain volume of water and a notable increase in the supersaturation of the massecuite, and a mixing and cooling apparatus having an inlet connected to the outlet of the flash tank for subsequently effectuating crystallization of the massecuite being fed to the cooling and mixing apparatus from the flash tank.

BRIEF DESCRIPTION OF DRAWING

The above and other objects, advantages and features of this invention will become more apparent from the following detailed description of certain now preferred embodiments of the invention, taken in conjunction with the accompanying diagrammatic drawing wherein.

DETAILED DESCRIPTION OF PREFERRED EMBODIMENTS

Figure 1:
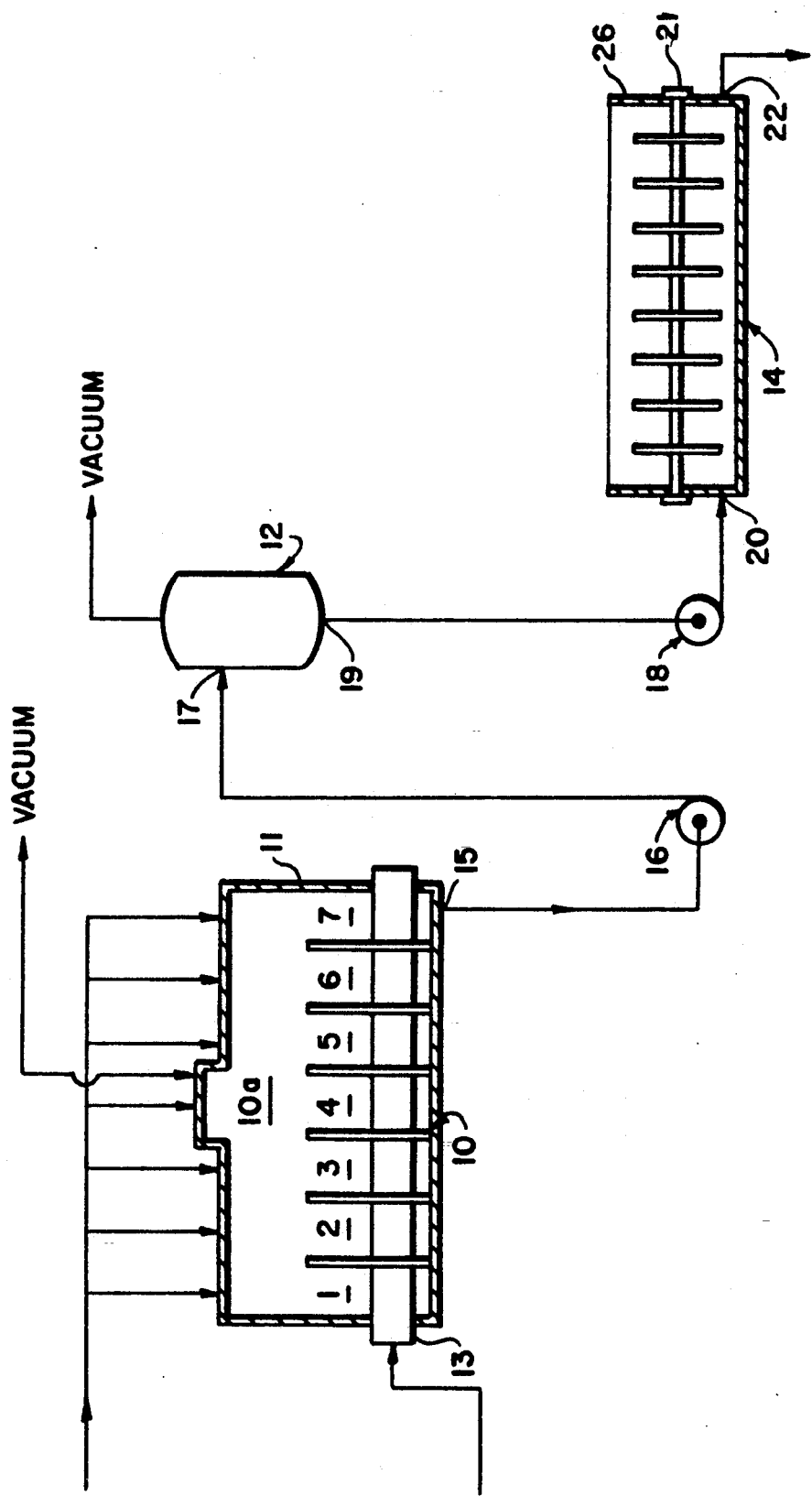
FIG. 1 is a diagram of one embodiment of an installation according to the present invention and FIG. 2 is a like diagrammatic illustration of another embodiment.

Referring now to the drawing wherein like reference numerals refer to like structures operating in a like manner, FIG. 1 shows an installation for the continuous production of sugar crystals from syrup, i.e. a sugar-containing aqueous juice. The apparatus comprises generally conventional crystallizing apparatus 10 for subjecting the syrup to a sufficient heat of evaporation to produce a massecuite comprising water and a small content of dry material and having a low supersaturation coefficient. The crystallizing apparatus includes horizontally extending closed crystallizing tank 11 divided into a succession of crystallization compartments or cells 1 to 7 by vertical partitions of a height less than that of the tank so that the compartments are in communication with each other through upper chamber 10a of tank 11. In addition, the compartments also communicate with each other through apertures in the vertical partitions so that the massecuite may circulate through the compartments towards outlet 15 for the massecuite. Heating means 13, which may be a steam heated radiator, extends through compartments 1 to 7 for generating the required evaporation heat, steam being fed to the radiator, as indicated by an arrow at the inlet side of the tank, to produce the calories required for the evaporation. Compartment 1 at the inlet side receives a concentrated syrup and a seed magma containing crystallization seeds. The succeeding compartments 2 to 7 receive metered amounts of syrup, the feed lines for the syrup being indicated by arrows at the top of tank 11. A source of vacuum is connected to upper chamber 10a of tank 11 for lowering the pressure therein below atmospheric pressure and correspondingly lowering the boiling temperature of the syrup. The final massecuite product produced in crystallizing tank 11 is extracted from compartment 7 through outlet 15 by pump 16.

Closed flash tank 12 is arranged in series with apparatus 10 and has inlet 17 and outlet 19, the inlet being connected to outlet 15 of tank 11 for feeding the massecuite by pump 16 from the tank outlet to the flash tank inlet. A vacuum means is connected to flash tank 12 for maintaining in the flash tank a pressure lower than the pressure in at least last compartment 7 at the outlet of the tank to cause flash evaporation of a certain volume of water and a notable increase in the supersaturation of the massecuite.

Mixing and cooling apparatus 14 is arranged in series with flash tank 12 and has inlet 20 connected to outlet 19 of the flash tank for subsequently effectuating crystallization of the massecuite being fed by pump 18 to the cooling and mixing apparatus from the flash tank. The mixing and cooling apparatus is generally conventional and comprises an open tank 26 traversed by rotor 21 equipped with vanes or blades for thoroughly mixing the massecuite and may further hold cooling elements, such as tubes or hollow plates through which cold water is circulated.

The massecuite extracted from crystallizing apparatus 10 is fed by pump 16 into flash tank 12. Since the pressure in the flash tank is lower than that in the crystallizing apparatus, the massecuite is subjected to a sudden expansion when it enters the flash tank to cause a certain volume of water to be evaporated and the massecuite to be cooled to an equilibrium temperature with the vapor pressure, taking into account the boiling point elevation. The water evaporation and the lowering of the temperature cause the coefficient of supersaturation of the mother liquor to be increased. The dwell time of the massecuite in flash tank 12 is very short, i.e. of the order of one minute or less.

The massecuite is extracted from flash tank 12 by pump 18 or any other suitable means and is fed to inlet 20 of mixing tank 19. The dwell time of the massecuite in apparatus 14 and the cooling therein are so controlled that an additional mass of sugar crystallizes on the existing sugar crystals before the product is removed through outlet 22.

The following Table gives a numerical working example of treating a sugar juice or syrup in a sugar refinery:

|  | BMC | RDT % | T° C. | Supersat. | Yield |
|---|---|---|---|---|---|
| Massecuite Outlet 15 | 91.00 | 50.00 | 86.84 | 1.030 | 100 |
| Massecuite Outlet 19 | 91.28 | 50.15 | 83.48 | 1.112 | 99.69 |
| Massecuite Outlet 22 | 91.28 | 53.00 | 82.98 | 1.030 | 99.69 |

The massecuite produced in apparatus 10 has a brix (BMC - dry matter) of 91 and a purity of 94.5, containing 50%, by weight, of sugar crystals (RDT). The brix of the massecuite is specifically maintained at a relatively low value by the addition of a metered amount of syrup in the last compartment of crystallizing tank 11 to reduce its viscosity and enhance the thermal exchange. The coefficient of supersaturation is 1.030 in the indicated working example but it may generally vary between about 1.02 and 1.05. In conventional sugar crystallization processes of this type, the coefficient of supersaturation of the massecuite coming from the continuous crystallizing apparatus is at least 1.10.

Upon entering flash tank 12, the massecuite is suddenly expanded from a pressure of 0.27 bar in apparatus 10 to a pressure of 0.23 bar in flash tank 12. This sudden expansion causes the flash evaporation of a certain volume of water, i.e. 0.31%, and consequently drops the temperature (T) from 86.84° C. to 83.48° C., bringing about an increase in the coefficient of supersaturation from 1.030 to 1.112. The content of crystals (RDT) increases slightly, from 50% to 50.15%, because of the evaporation of water.

In mixing and cooling apparatus 14, the temperature drops from 83.48° C. to 82.98° C., permitting an additional quantity of sugar to be crystallized and bringing the supersaturation to 1.030. The total increase in crystals is from 50% to 53%.

Figure 2:
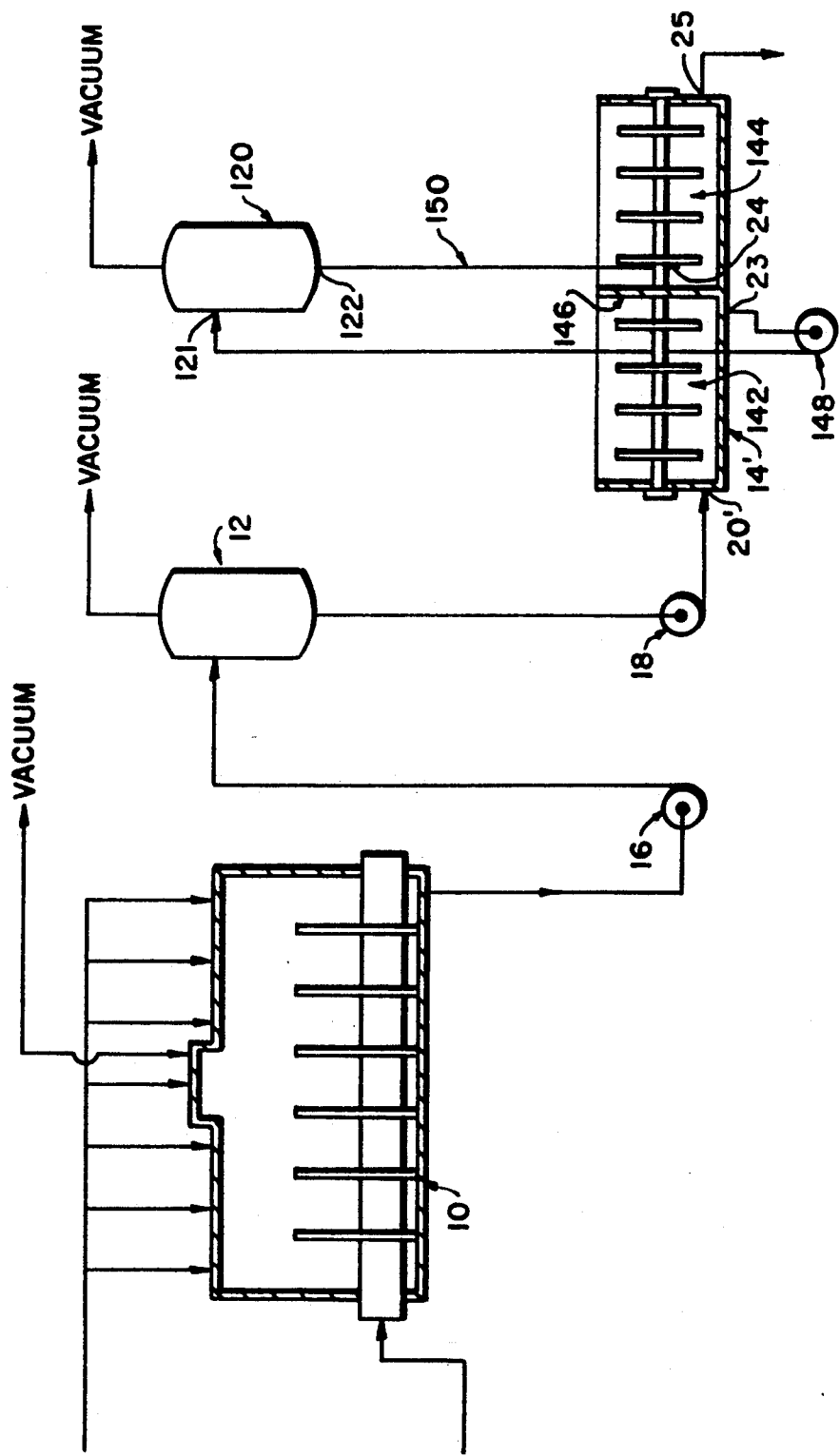

The installation diagrammatically shown in FIG. 2 is the same and operates in the same manner as that of FIG. 1 up to flask 12 but the rapid evaporation and the cooling of the massecuite are effected in several stages. In this embodiment, mixing and cooling apparatus 14' comprises two compartments 142 and 144 divided by a partition 146. Compartment 142 has inlet 20' through which the massecuite is fed by pump 18 from flash tank 12 and outlet 23, and compartment 144 has inlet 24 and outlet 25. This installation further comprises second flash tank 120 having inlet 121 and outlet 122, inlet 121 of second flash tank 120 being connected to outlet 23 of first compartment 142, and outlet 122 of the second flash tank being connected to inlet 24 of second compartment 144. Pump 148 feeds the massecuite cooled in compartment 142 from this compartment into flash tank 120. Vacuum means is connected to second flash tank 120 for maintaining in the second flash tank a pressure lower than the pressure in first flash tank 12 and such that it corresponds to an equilibrium temperature lower than that of the massecuite extracted from compartment 142, taking into account the boiling point elevation. As it enters flash tank 120, the massecuite is subjected to an expansion causing evaporation and a further cooling to a temperature of equilibrium with the pressure prevailing in the flash tank so that the supersaturation of the mother liquor is increased. The dwell time of the massecuite in flash tank 120 is of the same order of magnitude as that in flash tank 12.

The massecuite is extracted from flash tank 120 by barometric column 150 which feeds it to inlet 24 of second compartment 144 where the massecuite is subjected to another stage of cooling and crystallization. If desired, the mixing and cooling tank may comprise more than two successive compartments, and the massecuite is subjected to evaporation by expansion between each successive compartment so that the process proceeds in several stages. Obviously, instead of using a mixing tank with several compartments, several mixing tanks may be aligned in series.

The process and installation described hereinabove have the advantage of providing continuous crystallization while permitting operation at a low brix so that higher productivity is guaranteed because of greater coefficients of thermal exchange. Moreover, existing plants may be used without having to modify the plant structures.

If desired, syrup may be added to the massecuite coming from crystallizing apparatus 10 before it is fed to the flash tank which is at a higher vacuum. Also, if desired, the flash tank may be equipped with a stirrer for thoroughly mixing the massecuite therein.

What is claimed is:

1. A two-stage crystallization process for the continuous production of sugar crystals from syrup, which comprises the steps of
    (1) crystallizing the syrup in a first stage by subjecting the syrup to a sufficient heat of evaporation to produce a massecuite having a supersaturation coefficient between about 1.02 and 1.05, and subjecting the massecuite to an expansion causing a flash evaporation of water and an increase in the supersaturation, and
    (2) subsequently effectuating crystallization of the massecuite produced in the first stage by cooling in a second stage.

2. The two-stage crystallization process of claim 1, wherein the massecuite produced in the first stage is produced in a fist apparatus and is fed to a flash tank which is held under a higher vacuum than that under which the massecuite is produced in the first apparatus, and the dwell time of the massecuite in the flash tank is of the order of no more than one minute.

3. The two-stage crystallization process of claim 1, wherein the flash evaporation and the cooling of the massecuite are effected in several stages.

4. An installation for the continuous production of sugar crystals from syrup, which comprises, in series,
    (1) a crystallizing apparatus for subjecting the syrup to heat of evaporation to produce a massecuite, the crystallizing apparatus including a first tank divided into a succession of crystallization compartments and heating means for generating the evaporation heat, the first tank having an outlet for the massecuite,
    (2) a source of vacuum connected to the crystallizing apparatus for lowering the pressure therein below atmospheric pressure,
    (3) a flash tank having an inlet and an outlet, the inlet being connected to the outlet of the first tank for feeding the massecuite from the first tank outlet to the flash tank inlet,
    (4) means connected to the flash tank for maintaining in the flash tank a pressure lower than the pressure in at least a last one of the compartments at the outlet of the first tank to cause flash evaporation of a certain volume of water and an increase in the supersaturation of the massecuite, and
    (5) a mixing and cooling apparatus having an inlet connected to the outlet of the flash tank for subsequently effectuating crystallization of the massecuite being fed to the cooling and mixing apparatus from the flash tank.

5. An installation for the continuous production of sugar crystals from syrup, which comprises, in series,
    (1) a crystallizing apparatus for subjecting the syrup to heat of evaporation to produce a massecuite, the crystallizing apparatus including a first tank divided into a succession of crystallization compartments and heating means for generating the evaporation heat, the first tank having an outlet for the massecuite,
    (2) a source of vacuum connected to the crystallizing apparatus for lowering the pressure therein below atmospheric pressure,
    (3) a flash tank having an inlet and an outlet, the inlet being connected to the outlet of the first tank for feeding the massecuite from the first tank outlet to the flash tank inlet,
    (4) means connected to the flash tank for maintaining in the flash tank a pressure lower than the pressure in at least a last one of the compartments at the outlet of the first tank to cause flash evaporation of a certain volume of water and an increase in the supersaturation of the massecuite.
    (5) a mixing and cooling apparatus having an inlet connected to the outlet of the flash tank for subsequently effectuating crystallization of the massecuite being fed to the cooling and mixing apparatus from the flash tank, the mixing and cooling apparatus comprising
        (a) at least two compartments, each compartment having an inlet and an outlet,
    (6) a second flash tank having an inlet and an outlet, the inlet of the second flash tank being connected to the outlet of a first one of the compartments, and the outlet of the second flash tank being connected to the inlet of a second one of the compartments, and
    (7) means connected to the second flash tank for maintaining in the second flash tank a pressure lower than the pressure in the first flash tank.

* * * * *